3,819,606
PROCESS FOR THE MANUFACTURE OF POLYPEPTIDES

Christopher Frederick Hayward and Michael James Smithers, Macclesfield, England, assignors to Imperial Chemical Industries, Limited, London, England
No Drawing. Filed May 10, 1971, Ser. No. 142,073
Claims priority, application Great Britain, May 13, 1970, 23,219/70
Int. Cl. C07c 103/52
U.S. Cl. 260—112.5      7 Claims

ABSTRACT OF THE DISCLOSURE

An improved process for the manufacture of α-aspartyl-phenylalanine esters and α-aspartyl-(β-cyclohexyl)alanine esters by reacting aspartic acid or a protected derivative with an N-carbonyl derivative of a phenylalanine ester or a (β-cyclohexyl)alanine ester. The products are sweetening agents.

---

This application relates to a process for the manufacture of polypeptides and in particular it relates to a process for the manufacture of α-aspartyl peptides.

It is known, for example from Belgian Pat. No. 717,373, and German Offenlegungsschriften Nos. 1,936,159 and 1,948,788, that lower alkyl esters of L-α-aspartyl-L-phenyl-alanine and L-α-aspartyl-L-(β-cyclohexyl)alanine are useful as sweetening agents for pharmaceutical products and foodstuffs. These compounds have previously been prepared by reaction of a reactive derivative of aspartic acid, bearing protecting groups on the β-carboxyl group and the amino group, with the appropriate phenylalanine or β-cyclohexylalanine ester followed by removal of the protecting groups, or, in the case of the β-cyclohexylalanyl derivatives, by reduction of the phenylalanyl-containing dipeptide derivatives. Such processes involve a number of separate stages and it is an object of the present invention to provide a more convenient process for the manufacture of the above compounds.

The reaction of an N-carbonyl-amino-acid ester with an N-protected α-amino-acid to give a protected dipeptide ester has been described for a number of N-protected monocarboxylic α-amino-acids, but the reaction of a dicarboxylic α-amino-acid or an N-protected dicarboxylic α-amino-acid with a single molecular equivalent of an N-carbonyl-amino-acid has not been described. This latter reaction would be expected to give a mixture of products, but surprisingly, it has now been found that the reaction of aspartic acid or an N-protected derivative thereof with an N-carbonyl derivative of a phenylalanine or β-cyclohexylalanine ester gives predominantly the α-aspartyl dipeptide, and further it has been found that this reaction proceeds at a temperature much below that expected from the prior art.

According to the invention there is provided a process for the manufacture of an α-aspartyl dipeptide derivative of the formula:

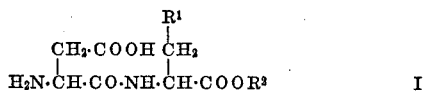

or a non-toxic salt thereof, wherein $R^1$ is a phenyl or cyclohexyl radical, and $R^2$ is an alkyl radical of 1–3 carbonatoms, which comprises reacting aspartic acid or a derivative thereof of the formula:

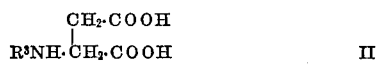

or a salt thereof, wherein $R^3$ is hydrogen or a protecting group known in the peptide art and susceptible of cleavage by hydrogenolysis or treatment with acid, with an N-carbonyl-amino-acid ester of the formula:

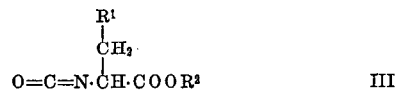

wherein $R^1$ and $R^2$ have the meanings stated above, followed, when $R^3$ is a protecting group, by replacement of this group by hydrogen by hydrogenolysis or treatment with acid.

The reaction may be carried out over a wide range of temperature, for example from 0° C. to 180° C. The reactants may be heated together in the presence or absence of a solvent or they may be allowed to react at ambient temperature or below in a solvent, optionally followed by a period during which the reactants are heated in a solvent. Conveniently, the reaction may be carried out in a solvent for 1 hour at a temperature from 50° C. to 130° C., but equally effectively, the reaction may be carried out in a solvent at ambient temperature (0–30° C.) for 4 to 20 hours and then, optionally, at a temperature of 50° C. to 130° C. for a period of, for example, 1 hour. It has been found that the addition to the reactants of approximately 0.1 molecular proportion of the amino-acid ester of formula IV (see later) after the reaction has proceeded for a period, for example approximately 4 hours at ambient temperature, has a beneficial effect on the yield of final product.

A suitable solvent which may be used for the reaction is, for example, acetone, acetonitrile, butyl acetate, carbon tetrachloride, chlorobenzene, chloroform, dioxan, ethyl acetate, nitrobenzene, nitromethane, tetrahydrofuran or toluene, and of these, ethyl acetate, chlorobenzene, toluene, dioxan, butyl acetate, acetone and acetonitrile are preferred.

A particularly suitable value for $R^2$ is, for example, a methyl, ethyl or n-propyl radical, and a particularly suitable value for $R^3$ when it is a protecting group is, for example, a trityl radical, a benzyloxycarbonyl radical optionally substituted by a nitro, halogen or methoxy substituent, an alkoxycarbonyl radical of up to 6 carbon atoms, for example a t-butyloxycarbonyl radical, or an o-nitrophenylsulphenyl radical.

The salt of aspartic acid or a derivative thereof of formula II may be an acid-addition salt or a base-addition salt, for example an alkali metal salt. A particularly suitable acid-addition salt of aspartic acid is, for example, a hydrochloride, hydrobromide, p-toluenesulphonate or perchlorate.

Since in the desired product, both the aspartyl residue and the phenylalanine of β-cyclohexylalanine residue are in the L-configuration and the process of the invention does not lead to racemisation of either amino-acid residue, it is essential that each reactant should contain some material in this configuration, but it is not essential that the whole of each reactant be in the L-configuration since the stereoisomers other than L—L are not bitter and do not detract from the sweetening effect of the L—L isomer; they merely dilute it. Thus either or both of the reactants may be in the DL- or L-configuration.

Particularly preferred compounds which may be manufactured by the process of the invention are L-α-aspartyl-L-phenylalanine methyl ester and L-α-aspartyl-L-(β-cyclohexyl)alanine methyl ester.

According to a further feature of the invention there is provided a modification of the above process for the manufacture of an α-aspartyl dipeptide derivative of formula I wherein the starting N-carbonyl-amino-acid ester is prepared in situ by reacting the corresponding amino-acid ester of the formula:

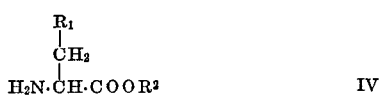

wherein R¹ and R² have the meaning stated above, with phosgene, preferably in the presence of an inert solvent, for example toluene or chlorobenzene.

A particular advantage of this modification is that it enables the whole reaction sequence from the amino-acid ester of formula IV i.e. formation of the N-carbamoyl derivative III, reaction of this derivative with aspartic acid or a derivative II, and, if necessary, removal of a protecting group to give the product of formula I, to be carried out in the same reaction vessel.

The amino-acid esters of formula IV are, in general, known compounds which can be prepared from the corresponding amino-acids by conventional means, or in the case of (β-cyclohexyl)alanine methyl ester, by the catalytic hydrogenation of tyrosine methyl ester in the presence of aqueous mineral acid as more fully described and claimed in our co-pending U.K. Application No. 23,220/70.

The invention is illustrated but not limited by the following Examples in which reference to, for example, $R_{FD}$ means an $R_F$ value determined by ascending thin layer chromatography on silica in solvent system D. The solvent systems so referred to have the following compositions by volume:

A—n-butanol-acetic acid-water (4:1:5)
B—n-butanol-acetic acid-water-pyridine (15:3:12:10)
D—acetonitrile-water (3:1)
E—methanol-chloroform (4:1)
F—cyclohexane-ethyl acetate-methanol (1:1:1)
G—chloroform-methanol-water (55:40:10)
H—diethyl ether-acetic acid-water (6:2:1)
J—ethanol-water (7:3)
K—n-propanol-water (7:3)
N—methyl ethyl ketone-pyridine-water-acetic acid (70:15:15:2)

In these Examples, the following method was used to determine the amount of α- and β-L-aspartyl-L-(β-cyclohexyl)alanine methyl ester or α- and β-L-aspartyl-L-phenylalanine methyl ester in the products. The product (approximately 1 mg. accurately weighed) was dissolved in 0.2 N pH 2.20 buffer (3 ml.). An aliquot of this solution (0.2 ml.) was applied to the top of the resin column of a Locarte Amino-acid Analyser (Locarte Ltd., 24 Emperors Gate, London S.W.7), and the resin column was eluted in the usual way with the programme, 0.2 N pH 3.20 buffer (65 minutes), 0.2 N pH 4.25 buffer (55 minutes), and 1.0 N pH 6.65 buffer (150 minutes). A mixture of the α- and β-peptides was thereby readily resolved. In the case of the α- and β-aspartyl-(β-cyclohexyl)alanine methyl esters, L-β-aspartyl-L-(β-cyclohexyl)alanine methyl ester was eluted first (after approximately 230 minutes), and L-α-aspartyl-L-(β-cyclohexyl)alanine methyl ester was eluted later (after approximately 290 minutes). Similarly, in the case of the α- and β-aspartyl-phenylalanine methyl esters, L-β-aspartyl-L-phenylalanine methyl ester was eluted after approximately 180 minutes, and L-α-aspartyl-L-phenylalanine methyl ester after approximately 230 minutes.

By calibrating the analyser with known weights of the pure α- and β-peptides, an accurate assessment may be made of the amounts of α- and β-peptide in the product. If an amino-acid analysis system different from that described above is used, then calibration in this way enables the relevant elution times to be determined.

EXAMPLE 1

A mixture of N-benzyloxycarbonyl-L-aspartic acid (0.534 g., 2 mmoles) and N-carbonyl-L-(β-cyclohexyl)alanine methyl ester (0.425 g., 2 mmoles) in dry toluene (2.5 ml.) was heated at reflux temperature for 1 hour. The solvent was then evaporated in vacuo, and the residual oil dissolved in a mixture of methanol and water (80:20 by volume) (30 ml.) and the solution hydrogenated for 5 hours at ambient temperature and atmospheric pressure over 5% palladium charcoal (200 mg.). The reaction mixture was filtered, and the filtrate evaporated to dryness in vacuo. The residue was then dissolved in water and the solution freeze dried to give a solid which was recrystallised from water (5 ml.) to give L-α-aspartyl-L-(β-cyclohexyl)alanine methyl ester. This product, $R_{FA}$ 0.57, $R_{FB}$ 0.77, $R_{FD}$ 0.47, $R_{FE}$ 0.52 (tails), $R_{FF}$ 0.14 (tails), $R_{FG}$ 0.56, $R_{FH}$ 0.43, $R_{FJ}$ 0.60, $R_{FK}$ 0.51, $R_{FN}$ 0.41, $$[\alpha]_D^{25} = -18.8°$$

(c. 2.13 in methanol) contained less than 1% of L-β-aspartyl-L-(β-cyclohexyl)alanine methyl ester, and was indistinguishable as a sweetening agent from samples of L-α-aspartyl-L-(β-cyclohexyl)alanine methyl ester prepared by previously published methods.

The N-carbonyl-L-(β-cyclohexyl)alanine methyl ester used as starting material was prepared as follows:

A stream of phosgene gas was passed into a stirred suspension of L-(β-cyclohexyl)alanine methyl ester hydrochloride (11.0 g., 50 mmole) in dry toluene (100 ml.) whilst the reaction mixture was heated over 30 min. to refluxing temperature. After being heated for 10 minutes at this temperature the reaction mixture formed a complete solution, and thereafter phosgene was passed for a further 50 minutes. The solution was allowed to reflux for a further 15 minutes before being cooled. Evaporation of the solvent gave a residual oil which was distilled (B.P. 136° C. at 7.5 mm.) to give 9.4 g. (89%) of N-carbonyl-L-(β-cyclohexyl)alanine methyl ester, refractive index at 24° C., 1.465, and infrared spectrum (film) showing peaks at 2265 cm.$^{-1}$(s) and 17150 cm.$^{-1}$(s) characteristic of isocyanate and ester respectively.

EXAMPLE 2

The process described in Example 1 was repeated four times except that the reaction mixture was heated for 1 hour at 60° C., 80° C. and 100° C. respectively and for 30 minutes at 80° C. In each case L-α-aspartyl-L-(β-cyclohexyl)alanine methyl ester, identical with the product described in Example 1, was obtained.

EXAMPLE 3

A mixture of L-aspartic acid (0.397 g., 2 mmole) and N-carbonyl-L-(β-cyclohexyl)alanine methyl ester (0.425 g., 2 mmole) was heated for 1 hour at 180° C. The reaction mixture was cooled and the residual solid was ground in a mortar and then extracted six times with water at 20–25° C. The combined aqueous extracts were filtered, and the filtrate freeze-dried to give L-α-aspartyl-L-(β-cyclohexyl)alanine methyl ester (170 mg. 28%).

EXAMPLE 4

A mixture of N - benzyloxycarbonyl-L-aspartic acid (0.534 g., 2 mmoles), N-carbonyl-L-(β-cyclohexyl) alanine methyl ester (0.425 g., 2 mmoles) and a solvent (nature as indicated in the following Table) (2.5 ml.) was heated (temperature as indicated in the Table) for 1 hour, and then evaporated in vacuo. The residue was dissolved in a mixture of methanol and water (80:20 by volume) (30 ml.), and the solution was shaken with hydrogen and 5% palladium charcoal (200 mg.) at ambient temperature and atmospheric pressure for 5 hours. The mixture was filtered, and the filtrate was evaporated in vacuo. The residue was freeze-dried for 24 hours to give a solid which was analysed for aspartic acid, α-methyl aspartate, L-α-aspartyl-L-(β-cyclohexyl) alanine methyl ester and L-β-aspartyl-L-(β-cyclohexyl)- alanine methyl ester using an amino-acid analyser. The following results were obtained:

| Solvent | Temperature, °C. | Percentage yield of product | | | |
|---|---|---|---|---|---|
| | | H.Asp. OH | H.Asp. OMe | α-Peptide | β-Peptide |
| Acetone | 56 | 7 | 7 | 56 | 20 |
| Acetonitrile | 82 | 8 | 7 | 52 | 22 |
| Butyl acetate | 80 | 9 | 11 | 57 | 16 |
| Do | 126 | 7 | 8 | 46 | 19 |
| Carbon tetrachloride | 77 | 5 | 2 | 47 | 12 |
| Chlorobenzene | 80 | 4 | 2 | 62 | 19 |
| Chloroform | 61 | 2 | 6 | 38 | 13 |
| Dioxan | 80 | 7 | 10 | 53 | 14 |
| Ethyl acetate | 77 | 0.5 | 6 | 69 | 16 |
| Tetrahydrofuran | 66 | 9 | 8 | 41 | 11 |
| Toluene | 80 | 6 | 2 | 63 | 18 |

EXAMPLE 5

A solution of N-(o-nitrophenylsulphenyl)-L-aspartic acid (572 mg., 2 mmoles) (Zervas et al., J. Amer. Chem. Soc., 1963, 85, 3660) and N-carbonyl-L-(β-cyclohexyl) alanine methyl ester (425 mg., 2 mmoles) in dry dioxan (2.5 ml.) was heated at 80° C. under reflux for 1 hour. The solution was cooled to 0° C., 4 N-hydrogen chloride in ethyl acetate (1 ml.) was added, and the mixture was kept at 0° C. for 10 minutes. Dry ether (50 ml.) was then added and the solid was collected, washed well with ether and dried at 20° C. in vacuo, to give a solid (445 mg. 66%) consisting, predominantly, of L-α-aspartyl-L-(β-cyclohexyl)alanine methyl ester hydrochloride.

EXAMPLE 6

A stream of phosgene gas was passed into a stirred suspension of L-(β-cyclohexyl)alanine methyl ester hydrochloride (24.2 g., 110 mmoles) in dry toluene (200 ml.) whilst the reaction mixture was heated over 30 minutes to refluxing temperature. The mixture was then boiled under reflux for 1 hour with continued passage of phosgene during the first 30 minutes only. The resulting solution was cooled to 80° C., N-benzyloxycarbonyl-L-aspartic acid (26.6 g., 100 mmoles) was added, and the mixture was boiled under reflux until evolution of carbon dioxide ceased (1–3 hours). The solvent was evaporated in vacuo, and the residue was dissolved in a mixture of methanol and water (80:20 by volume) (300 ml.). 5% Palladium charcoal (5 g.) was added, and the mixture was shaken under hydrogen at ambient temperature and atmospheric pressure for 4 hours and then filtered. The filtrate was evaporated in vacuo, to give a solid residue (30 g., 100% yield based on N-benzyloxycarbonyl-L-aspartic acid) consisting, predominantly, of L-α-aspartyl-L-(β-cyclohexyl)alanine methyl ester.

EXAMPLE 7

A mixture of N-benzyloxycarbonyl-L-aspartic acid (0.534 g., 2 mmole) N-carbonyl-L-phenylalanine methyl ester (0.410 g., 2 mmole) and dry toluene (2.5 ml.) was heated at reflux temperature for 1 hour, and then evaporated. The residue was dissolved in a mixture of methanol and water (80:20 by volume) (30 ml.), and the resulting solution was shaken with hydrogen at ambient temperature and atmospheric pressure over 5% palladium charcoal (200 mg.) for 6 hours. The mixture was filtered with the aid of kieselguhr, and the filtrate was evaporated in vacuo, to give a solid residue (0.6 g., 100% yield) consisting, predominantly, of L-α-aspartyl-L-phenylalanine methyl ester, $R_{FA}$ 0.50, $R_{FB}$ 0.59, $R_{FD}$ 0.41, $R_{FG}$ 0.45.

The N-carbonyl-L-phenylalanine methyl ester used as starting material was prepared as follows:

Phosgene was passed into a suspension of L-phenylalanine methyl ester hydrochloride (30 g., 0.14 moles) in toluene (100 ml.) at the reflux, for 2 hours. After about 20 minutes a clear solution was obtained. At the end of the reaction, the solution was cooled and then evaporated under reduced pressure to leave an oil. Distillation of this crude product gave N-carbonyl-L-phenylalanine methyl ester 26 g. (B.P. 98–104° C./0.03 mm., 91% yield) as a colourless mobile liquid having refractive index at 25° C., 1.511, and showing peaks in the infra-red spectrum at 2265 cm.$^{-1}$ (isocyanate) and 1750 cm.$^{-1}$ (ester).

EXAMPLE 8

A mixture of N-benzyloxycarbonyl-L-aspartic acid (2.673 g., 10 mmole), N-carbonyl-L-(β-cyclohexyl) alanine methyl ester (2.113 g., 10 mmole) and ethyl acetate (12 ml.) was stirred magnetically for 4 hours at 4° C. and refluxed for 1 hour. The ethyl acetate was removed in vacuo and the residual oil dissolved in a mixture of methanol and water (80:20 by volume) (125 ml.). The solution was shaken with hydrogen and 5% palladium charcoal (1 g.) at ambient temperature and atmospheric pressure for 5 hours. The mixture was filtered and the filtrate evaporated in vacuo. The residue was freeze-dried to give crude product (3 g.), which was recrystallised from hot water (12 ml.) to give α-aspartyl-L-(β-cyclohexyl)alanine methyl ester (1.93 g., 61%). $R_{FD}$=0.44, $[α]_D^{25}$=—18° (c.=2.025 in methanol), $[α]_D^{25}$ of authentic sample =—17.8° (c.=2 in methanol.)

EXAMPLE 9

A mixture of N - benzyloxycarbonyl - L - aspartic acid (2.673 g., 10 mmole), N - carbonyl - L - (β-cyclohexyl) alanine methyl ester (2.115 g., 10 mmole) and ethyl acetate (12 ml.) were stirred together at room temperature for 4 hours, after which L-(β-cyclohexyl)alanine methyl ester (1 mmole, 10%) was added, in ethyl acetate (10 ml.) and stirring continued at room temperature overnight. The ethyl acetate was removed in vacuo and the residual oil dissolved in a mixture of methanol and water (80:20 by volume) (125 ml.). The solution was shaken with hydrogen and 5% palladium charcoal (1 g.) at ambient temperature and atmospheric pressure for 5 hours. The mixture was filtered and the filtrate evaporated in vacuo. The residue was freeze-dried to give crude product (3.3 g.) which was recrystallised from hot water (12 ml.) to give L-α-aspartyl-L-(β-cyclohexyl)alanine methyl ester (2.41 g., 80%, based on benzyloxycarbonyl-L-aspartic acid), $[α]_D^{25}$=—19.5° (c.=1.995 in methanol). Authentic sample gave —17.8° (c.=2 in methanol).

What we claim is:

1. A process for the manufacture of an α-aspartyl dipeptide derivative of the formula:

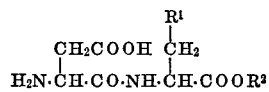

or a non-toxic salt thereof, wherein $R^1$ is a phenyl or cyclohexyl radical, and $R^2$ is an alkyl radical of 1–3 carbon atoms, which comprises reacting a dicarboxylic acid of the formula:

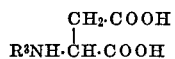

or a salt thereof, wherein $R^3$ is hydrogen, trityl, benzyloxycarbonyl, (nitro)benzyloxycarbonyl, (halo)benzyloxycarbonyl, (methoxy)benzyloxycarbonyl, alkoxycarbonyl of up to 6 carbon atoms of o-nitrophenylsulphenyl, with an N-carbonyl-amino-acid ester of the formula:

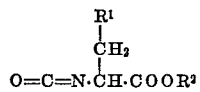

wherein $R^1$ and $R^2$ have the meanings stated above, followed, when $R^3$ is other than hydrogen, by replacement of this group by hydrogen by hydrogenolysis or hydrolysis with acid, said process being characterized by the production of said α-aspartyl dipeptide derivative in an amount exceeding that of any corresponding β-aspartyl dipeptide derivative.

2. A process as claimed in claim 1 wherein the salt of said acid is an alkali metal salt.

3. A process as claimed in claim 1 wherein the salt of said acid is a hydrochloride, hydrobromide, p-toluenesulphonate or perchlorate.

4. A process as claimed in claim 1 which is carried out in ethyl acetate, chlorobenzene, toluene, dioxan, butyl acetate, acetone or acetonitrile.

5. A process as claimed in claim 5 which is carried out for at least part of the reaction period at a temperature of from 0–30° C.

6. A process as claimed in claim 1 wherein the corresponding amino-acid ester of the formula:

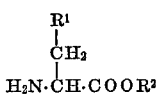

is added to the reaction mixture after the initial reaction has proceeded for a period.

7. A process as claimed in claim 1 wherein the N-carbonyl-amino-acid ester used as one of the reactants is prepared *in situ* by reacting the corresponding amino-acid ester of the formula:

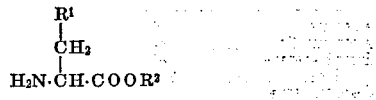

with phosgene in the presence of an inert solvent.

References Cited

Govindachari et al. "Tetrahedron," vol. 23, pp. 4811–4815 (1967).

"The Peptides" by Schröder et al. (1965), pp. 129–130.

ELBERT L. ROBERTS, Primary Examiner

U.S. Cl. X.R.

424—177